United States Patent
Jeong et al.

(10) Patent No.: US 11,338,240 B2
(45) Date of Patent: May 24, 2022

(54) PARTICULATE MATTER COLLECTING APPARATUS

(71) Applicants: Samsung Electronics Co., Ltd., Suwon-si (KR); IUCF-HYU (Industry-University Cooperation Foundation Hanyang University), Seoul (KR)

(72) Inventors: Joonseon Jeong, Seoul (KR); Sejin Yook, Seoul (KR); Kitae Park, Seoul (KR); Gihyun Song, Suwon-si (KR); Ikhyun An, Seoul (KR); Hyoungwoo Choi, Hwaseong-si (KR); Jinkyu Kang, Hwaseong-si (KR); Hyunchul Lee, Hwaseong-si (KR)

(73) Assignees: SAMSUNG ELECTRONICS CO., LTD., Gyeonggi-do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 17/038,339

(22) Filed: Sep. 30, 2020

(65) Prior Publication Data
US 2021/0322917 A1    Oct. 21, 2021

(30) Foreign Application Priority Data

Apr. 16, 2020    (KR) .......................... 10-2020-0046269

(51) Int. Cl.
*B01D 50/00*    (2022.01)
*B01D 47/06*    (2006.01)
*B01F 23/20*    (2022.01)
*B01D 50/40*    (2022.01)

(Continued)

(52) U.S. Cl.
CPC ............. *B01D 50/40* (2022.01); *B01D 45/08* (2013.01); *B01D 47/06* (2013.01); *B01F 23/214* (2022.01)

(58) Field of Classification Search
CPC ........ B01F 23/214; B01F 23/20; B01D 47/00; B01D 47/06
See application file for complete search history.

(56) References Cited

U.S. PATENT DOCUMENTS 3,006,436 A * 10/1961 Starbuck ................ B01D 47/14
                                                                96/300
2010/0071554 A1    3/2010 Pfeffer et al.
2017/0209824 A1    7/2017 Abbott

FOREIGN PATENT DOCUMENTS

CN          204582864 U  *  8/2015  ............. B01D 50/00
KR     1020060026926 A       3/2006
KR     1020180128792 A      12/2018

* cited by examiner

*Primary Examiner* — Robert A Hopkins
(74) *Attorney, Agent, or Firm* — Cantor Colburn LLP

(57) ABSTRACT

A particulate matter collecting apparatus includes a duct, a water sprayer, a micro-channel forming unit, and an impactor. A gas-liquid mixed fluid is formed by spraying water to air flowing along the inside of the duct using the water sprayer. The gas-liquid mixed fluid collides with a collision plate of the impactor after passing through a plurality of micro-channels provided in the micro-channel forming unit. Particulate matter in air is collected by droplets or a liquid film formed on the plurality of micro-channels and the collision plate. Water flowing down from the plurality of micro-channels is discharged through a first water outlet.

20 Claims, 18 Drawing Sheets

(51) Int. Cl.
*B01D 45/08* (2006.01)
*B01F 23/21* (2022.01)

PARTICULATE MATTER COLLECTING APPARATUS

CROSS-REFERENCE TO RELATED APPLICATION

This application claims priority to Korean Patent Application No. 10-2020-0046269, filed on Apr. 16, 2020, and all the benefits accruing therefrom under 35 U.S.C. § 119, the content of which in its entirety is herein incorporated by reference.

BACKGROUND

Disclosed is an apparatus for collecting particulate matter in gas.

A particulate matter collecting apparatus purifies air by collecting particulate matter in gas, for example, air. The particulate matter collecting apparatus may be applied to an industrial dust collecting facility, an in-building air-conditioning/ventilation system, etc.

Filtering methods are common methods of removing particulate matter in air. The filtering methods are methods of collecting particulate matter included in air using a filter. The filtering methods may have excellent dust removal efficiency, and may filter various types of dust from air. However, when the amount of particulate matter collected by a filter increases, the performance of the filter may be degraded, and the pressure drop from the filter may increase. Therefore, the filter may be periodically managed or replaced.

SUMMARY

Provided is a wet particulate matter collecting apparatus capable of effectively removing particulate matter.

Provided is a particulate matter collecting apparatus capable of improving the dust collection performance.

Provided is a particulate matter collecting apparatus having less periodic management burden.

According to one aspect, a particulate matter collecting apparatus includes: a duct through which air flows; a water sprayer which forms a gas-liquid mixed fluid by spraying water inside the duct; a micro-channel forming unit defining a plurality of micro-channels through which the gas-liquid mixed fluid passes and including a first water outlet which discharges water flowing down from the plurality of micro-channels; and an impactor having a plurality of collision plates with which the gas-liquid mixed fluid passing through the plurality of micro-channels collides.

Exits of the plurality of micro-channels may be arranged regularly.

Each of the plurality of collision plates may face at least one exit column of the plurality of micro-channels.

The plurality of collision plates may extend in a gravity direction, and may be arranged in a direction orthogonal to the gravity direction.

The micro-channel forming unit may include a plurality of beads stacked in two or more layers in a flow direction of the gas-liquid mixed fluid, and the plurality of micro-channels may be defined by pores between the plurality of beads.

The particulate matter collecting apparatus may further include an opening plate located between the micro-channel forming unit and the impactor, and in which regular openings are defined.

The micro-channel forming unit may be provided in plural, and the plurality of micro-channel forming units may be stacked in the flow direction of the gas-liquid mixed fluid.

At least one of the plurality of micro-channel forming units may have the plurality of beads of which diameters are different from the diameters of the plurality of beads of the remaining micro-channel forming units.

The impactor may be provided in plural and the plurality of impactors may be arranged at downstream sides of the plurality of micro-channel forming units, respectively.

According to one aspect, a particulate matter collecting apparatus includes: a duct through which air flows; a water sprayer which sprays water inside the duct to form a gas-liquid mixed fluid; a micro-channel forming unit having a channel forming frame and a plurality of beads stacked in two or more layers in a flow direction of the gas-liquid mixed fluid on the channel forming frame to define a plurality of micro-channels through which the gas-liquid mixed fluid passes; and an impactor having a plurality of collision plates with which the gas-liquid mixed fluid passing through the plurality of micro-channels collides, and arranged at intervals.

The plurality of collision plates may extend in a gravity direction, and may be arranged in a direction orthogonal to the gravity direction.

The diameters of the plurality of beads may be non-uniform. The particulate matter collecting apparatus may further include an opening plate located between the micro-channel forming unit and the impactor, and in which regular openings are defined.

The diameters of the plurality of beads may be the same.

The micro-channel forming unit may be provided in plural, and the plurality of micro-channel forming units may be stacked in the flow direction of the gas-liquid mixed fluid. At least one of the plurality of micro-channel forming units may have the plurality of beads of which diameters are different from the diameters of the plurality of beads of the remaining micro-channel forming units. The impactor may be provided in plural, and the plurality of impactors may be arranged at downstream sides of the plurality of micro-channel forming units, respectively.

A liquid film formed by water may be formed on surfaces of the plurality of micro-channels, and a first water outlet which discharges water flowing down along the surfaces of the plurality of micro-channels may be provided in the channel forming frame.

The liquid film formed by water may be formed on surfaces of the plurality of collision plates, and the impactor may include a second water outlet which discharges water flowing down along the plurality of collision plates.

At least one water outlet may be provided in the duct.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
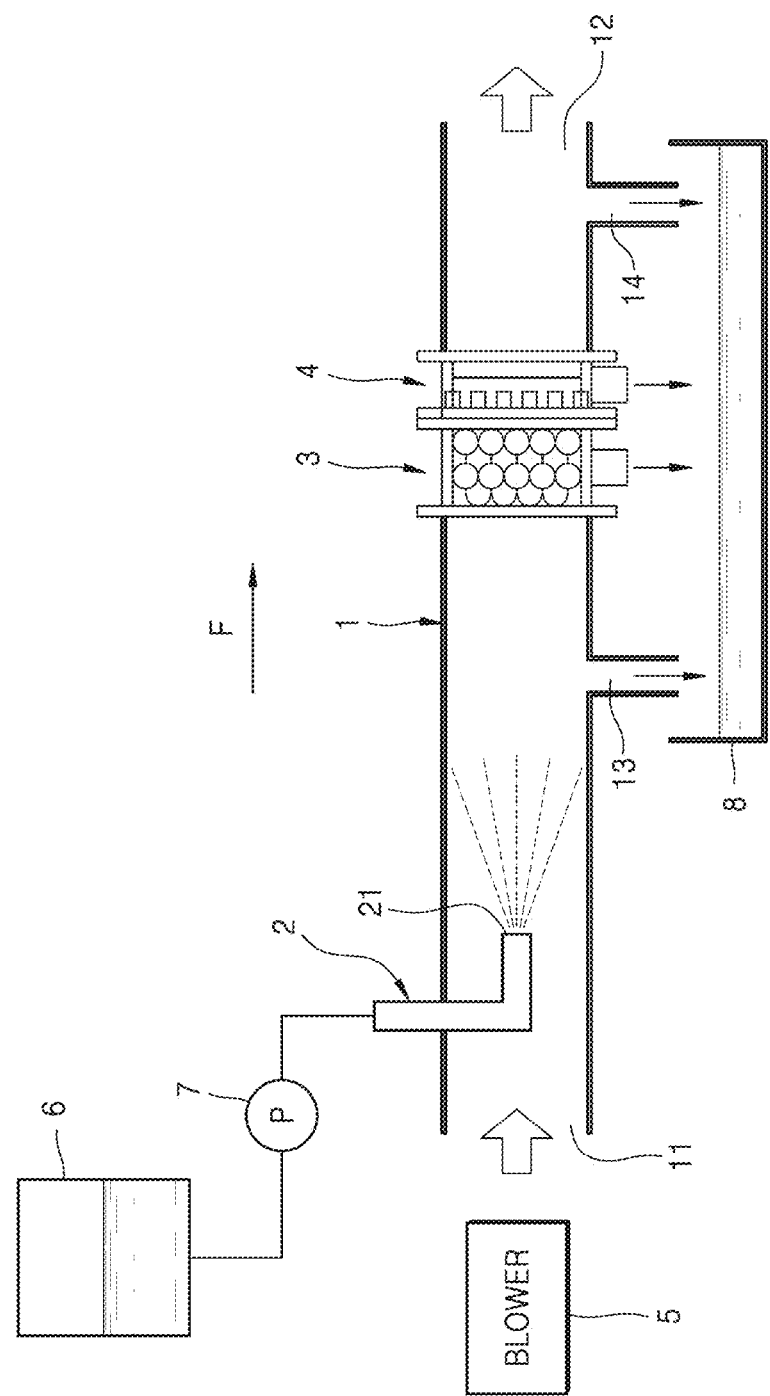
FIG. 1 is a schematic block diagram of an embodiment of a particulate matter collecting apparatus.

Hereinafter, an embodiment of the disclosure will be described in detail with reference to the accompanying drawings. In the following drawings, like reference numerals refer to like elements, and the size of each element on the drawings may be exaggerated for clarity and convenience of the description. It will be understood that when an element is referred to as being "on" another element, it can be directly on the other element or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 2:
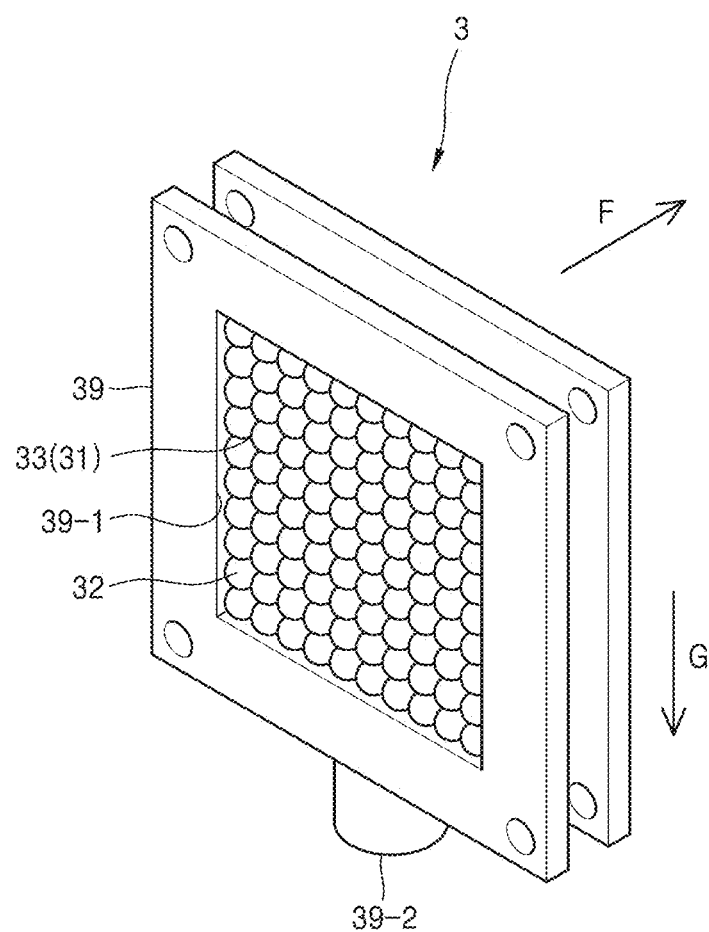
FIG. 2 is a schematic perspective view of an embodiment of a micro-channel forming unit illustrated in FIG. 1.
Figure 3:
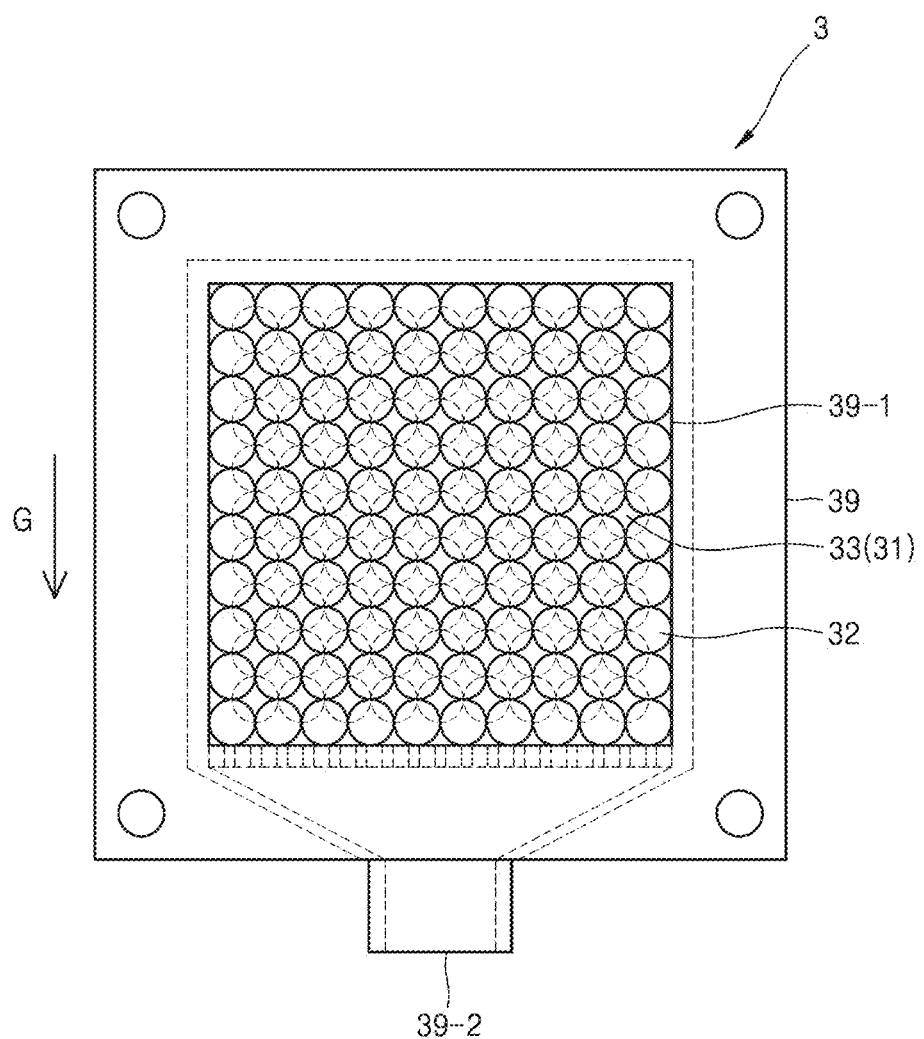
FIG. 3 is a schematic front view of an embodiment of the micro-channel forming unit illustrated in FIG. 2.
Figure 4:
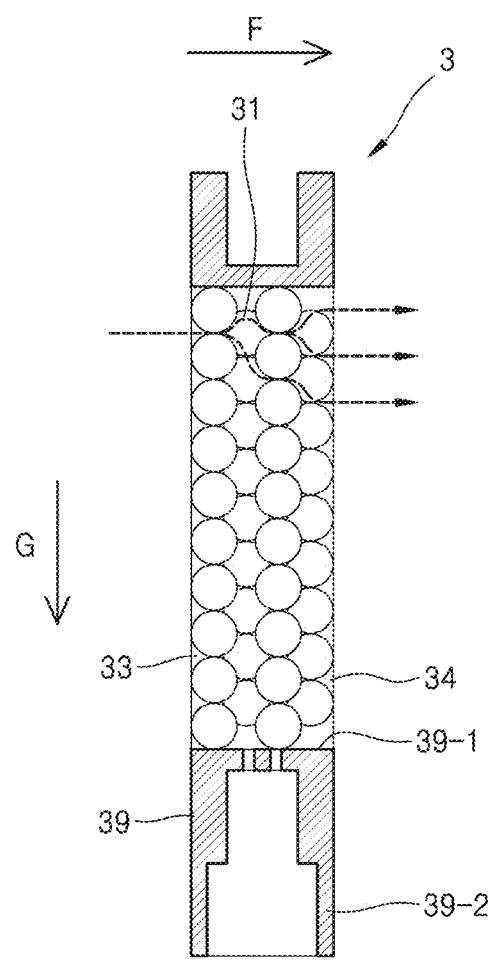
FIG. 4 is a schematic cross-sectional view of an embodiment of the micro-channel forming unit illustrated in FIG. 2.
Figure 5:
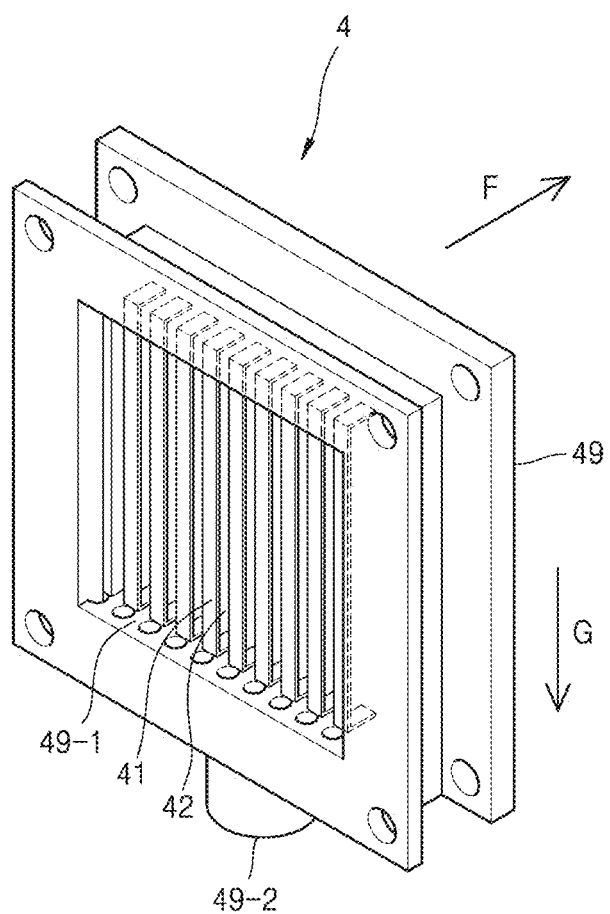
FIG. 5 is a schematic perspective view of an embodiment of an impactor illustrated in FIG. 1.
Figure 6:
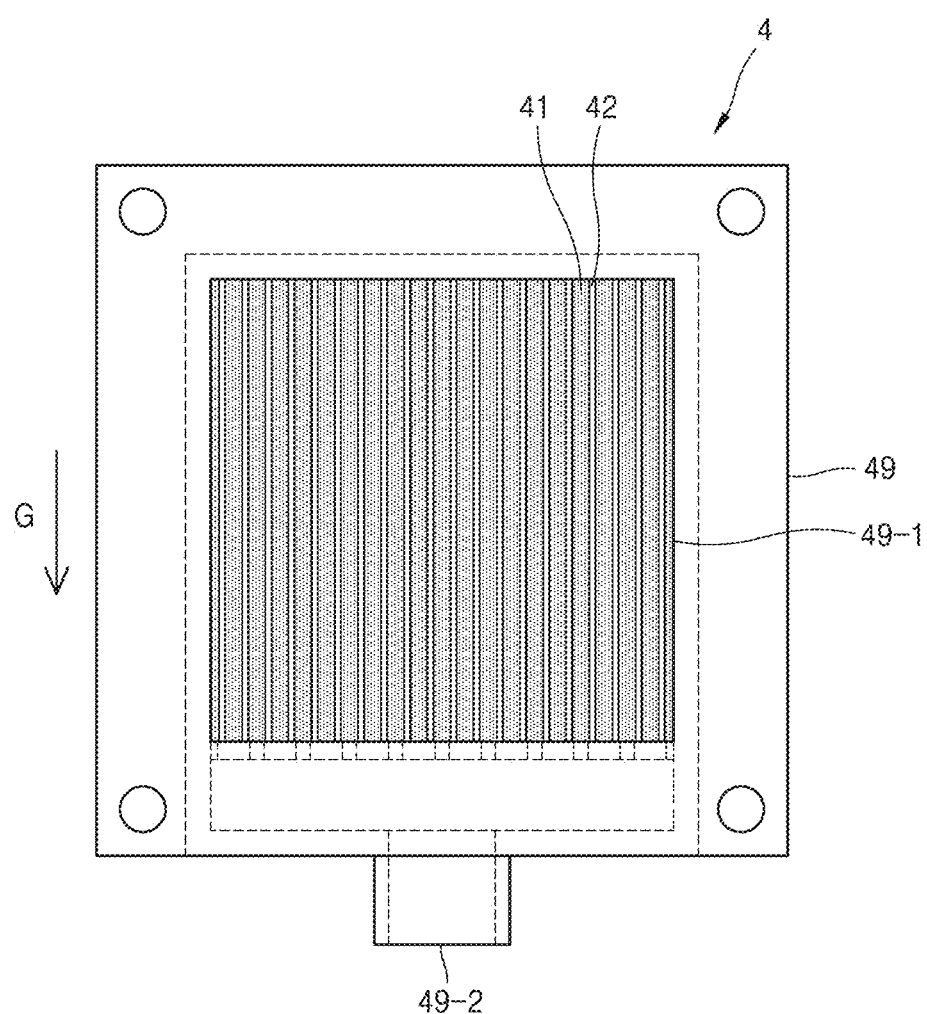
FIG. 6 is a schematic front view of an embodiment of the impactor illustrated in FIG. 5.
Figure 7:
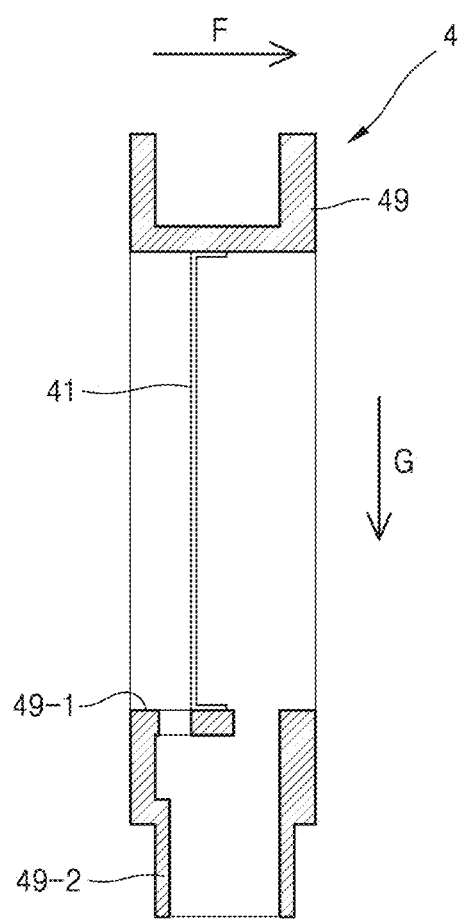
FIG. 7 is a schematic cross-sectional view of an embodiment of the impactor illustrated in FIG. 5.

FIG. 1 is a schematic block diagram of an embodiment of a particulate matter collecting apparatus. FIG. 2 is a schematic perspective view of an embodiment of a micro-channel forming unit 3 illustrated in FIG. 1. FIG. 3 is a schematic front view of an embodiment of the micro-channel forming unit 3 illustrated in FIG. 2. FIG. 4 is a schematic cross-sectional view of an embodiment of the micro-channel forming unit 3 illustrated in FIG. 2. FIG. 5 is a schematic perspective view of an embodiment of an impactor 4 illustrated in FIG. 1. FIG. 6 is a schematic front view of an embodiment of the impactor 4 illustrated in FIG. 5. FIG. 7 is a schematic cross-sectional view of an embodiment of the impactor 4 illustrated in FIG. 5.

Referring to FIGS. 1 to 7, the particulate matter collecting apparatus may include: a duct 1 through which air flows; a water sprayer 2 forming a gas-liquid mixed fluid by spraying water inside the duct 1; a micro-channel forming unit 3 defining a plurality of micro-channels 31 through which the gas-liquid mixed fluid passes and having a first water outlet (39-2) discharging water flowing down from the plurality of micro-channels 31; and an impactor 4 having a plurality of collision plates 41 with which the gas-liquid mixed fluid passing through the plurality of micro-channels 31 collides. The micro-channel forming unit 3 may include a channel forming frame 39 and a plurality of beads 32 stacked in two or more layers in a flow direction F of the gas-liquid mixed fluid in the channel forming frame (39). The plurality of beads 32 defines the plurality of micro-channels 31 through which the gas-liquid mixed fluid passes. The plurality of collision plates 41 may be arranged at intervals 42 from each other.

The duct 1 forms an air flow path. The shape of the duct 1 is not particularly limited. For example, a cross-sectional shape of the duct 1 may be various, such as circle or polygon. The cross-sectional shape of the duct 1 of the embodiment in FIG. 1 is a quadrangle. For example, air containing particulate matter is supplied to the duct 1 through an inlet 11 by a blower 5. The air flows along the air flow path formed by the duct 1 to be discharged through an exit 12. Here, the flow direction F is defined as a direction perpendicular to the cross-section of the duct 1, and substantially corresponds to the air flow path of the duct 1.

The water sprayer 2 sprays water inside the duct 1. The water sprayer 2 may include one or more spray nozzles 21. For example, water stored in a water tank 6 is pressurized by a pump 7 to be sprayed inside the duct 1 in a fine droplet shape through the spray nozzles 21. In this operation, a part of particulate matter (e.g., dust) contained in air is collected by droplets. A gas-liquid mixed fluid in which air and droplets are mixed is formed in the duct 1. The gas-liquid mixed fluid flows from the inlet 11 to the exit 12 along the air flow path defined by the duct 1.

The micro-channel forming unit 3 defines the plurality of micro-channels 31. According to an embodiment, the micro-channel forming unit 3 may include the plurality of beads 32 stacked in two or more layers in the flow direction F of the gas-liquid mixed fluid. The plurality of micro-channels 31 may be formed by pores defined between the plurality of beads 32. According to an embodiment, the micro-channel forming unit 3 includes the channel forming frame 39. The channel forming frame 39 is provided with a packing portion 39-1 in which the plurality of beads 32 is packed. The shape and size of the packing portion 39-1 may correspond to the cross-sectional shape and size of the duct 1.

In an embodiment, for example, each of the plurality of beads 32 of an embodiment has a spherical body. The diameters of the plurality of beads 32 may be the same. The plurality of beads 32 may be packed in the packing portion 39-1 in various shapes. Packing shapes of the plurality of beads 32 may be various, for example, a cubic structure, such as a primitive centered cubic ("PCC") structure, a face-centered cubic ("FCC") structure and a body-centered cubic ("BCC") structure, and a hexagonal closed-packed ("HOP") structure. The porosity of the PCC structure is about 48.6 percentages (%). The porosity of the FCC structure is about 26%. The porosity of the BCC structure is about 32%.

The plurality of micro-channels 31 may be defined by at least three adjacent beads 32. The plurality of micro-channels 31 are formed to generally extend in the flow direction F of the gas-liquid mixed fluid. Depending on the packing shapes and the number of stacking layers of the plurality of beads 32, the plurality of micro-channels 31 may be bent in an inclined direction with respect to the flow direction F of the gas-liquid mixed fluid (that is, the plurality of micro-channels 31 has curved paths rather than straight paths), as indicated by a dotted line in FIG. 4. Referring to FIG. 3, centers of the beads 32 in one layer (indicated by solid lines) overlap the micro-channels 31 in the next layer (indicated by dotted lines) in the front view, for example. For this reason, the plurality of micro-channels 31 has curved paths. A cross-sectional area of the plurality of micro-channels 31 is repeatedly contracted and expanded in the flow direction F of the gas-liquid mixed fluid along the contour of the plurality of beads 32. While the gas-liquid mixed fluid passes through the plurality of micro-channels 31, a part of droplets in which particulate matter is collected collides with surfaces of the plurality of beads 32, and thus is attached thereto. Another part of the droplets in which particulate matter is not collected also collides with the surfaces of the plurality of beads 32, and thus is attached thereto. A liquid film is formed on the surfaces of the plurality of beads 32 by the droplets. Particulate matter not collected by the droplets is in contact with the liquid film formed on the surfaces of the plurality of beads 32 to thereby be collected by the liquid film while passing through the plurality of micro-channels 31. The liquid film flows downward along the surfaces of the plurality of beads 32 by gravity.

The micro-channel forming unit 3 may include the first water outlet 39-2 discharging water flowing down from the plurality of micro-channels 31. The first water outlet 39-2 is provided in the channel forming frame 39 to discharge water flowing down along the surfaces of the plurality of beads 32 defining the plurality of micro-channels 31. The first water outlet 39-2 is formed to be opened downward under the packing portion 39-1. The droplets flowing downward along the surfaces of the plurality of beads 32 are discharged through the first water outlet 39-2. Particulate matter collected by the droplets is discharged through the first water outlet 39-2 together with the droplets.

Figure 8:
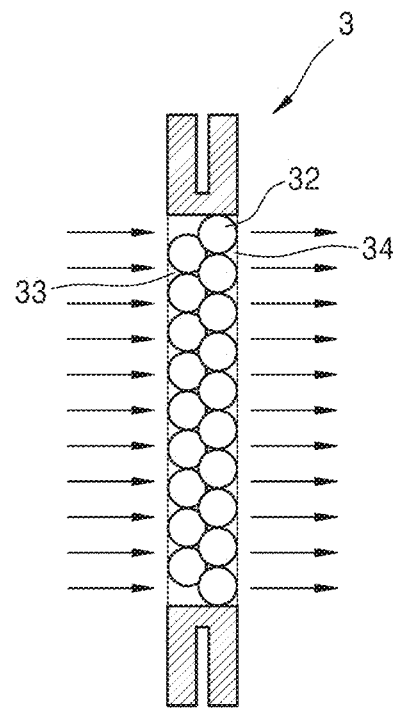
FIG. 8 shows an embodiment of a micro-channel forming unit including a plurality of beads stacked in two layers.
Figure 9:
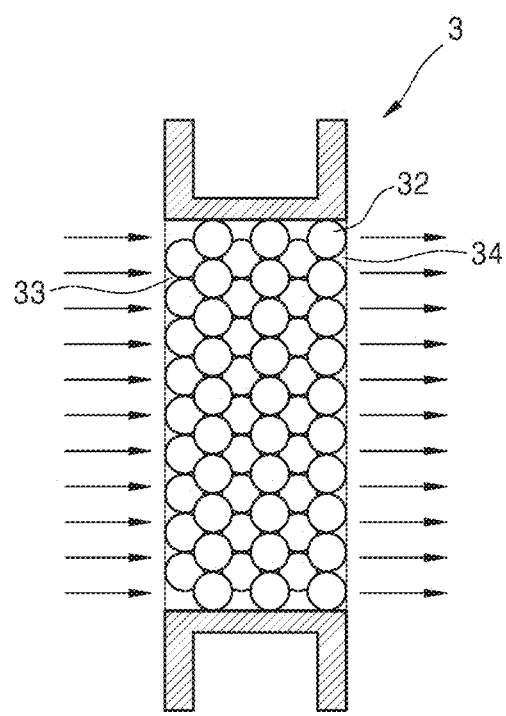
FIG. 9 shows an embodiment of a micro-channel forming unit including a plurality of beads stacked in six layers.

To increase the probability of contact between the gas-liquid mixed fluid and the plurality of beads 32 while passing through the plurality of micro-channels 31, the plurality of beads 32 may be stacked in at least two layers. FIG. 8 illustrates the micro-channel forming unit 3 including the plurality of beads 32 stacked in two layers in the flow direction F. FIG. 9 illustrates the micro-channel forming unit 3 including the plurality of beads 32 stacked in six layers in the flow direction F. As a result, the plurality of micro-channels 31 are bent in an inclined direction with respect to the flow direction F of the gas-liquid mixed fluid at least once between inlets 33 and exits 34, and the cross-sectional area of the plurality of micro-channels 31 is repeatedly contracted and expanded at least once in the flow direction F of the gas-liquid mixed fluid between the inlets 33 and the exits 34. Accordingly, the probability of contact between the gas-liquid mixed fluid and the plurality of beads 32 increases, and thus the particulate matter collection efficiency may be improved.

The micro-channel forming unit 3 of an embodiment of FIG. 4 includes the plurality of beads 32 of a four-layered structure, packed in the BCC structure. The plurality of micro-channels 31 are defined by the four adjacent beads 32. The plurality of beads 32 are a spherical body having a constant diameter. Accordingly, the exits 34 (FIG. 4) of the plurality of micro-channels 31 are arranged in a constant (regular) pattern.

As the porosity of the plurality of beads 32 becomes smaller and the number of stacking layers thereof becomes larger, particulate matter may be effectively collected to thereby improve the air purification efficiency, but a differential pressure (pressure drop) of the gas-liquid mixed fluid increases to thereby reduce an air purification flow rate. On the other hands, as the porosity of the plurality of beads 32 becomes larger and the number of stacking layers thereof becomes smaller, the air purification efficiency decreases, but a differential pressure (pressure drop) of the gas-liquid mixed fluid is small to thereby increase an air purification flow rate. The packing shapes and the number of stacking layers of the plurality of beads 32 may be appropriately selected in consideration of a required air purification flow rate, air purification efficiency, and porosity.

The impactor 4 is located at a downstream side of the micro-channel forming unit 3 in the flow direction F of the gas-liquid mixed fluid. Here, a downstream side of an element is defined as a rear side of the element from which the gas-liquid mixed fluid flows. The impactor 4 includes the plurality of collision plates 41. For example, the impactor 4 includes an impactor frame 49. The impactor frame 49 is provided with a hollow portion 49-1 in which the plurality of collision plates 41 is arranged. The shape and size of the hollow portion 49-1 may correspond to the cross-sectional shape and size of the duct 1.

Figure 10:
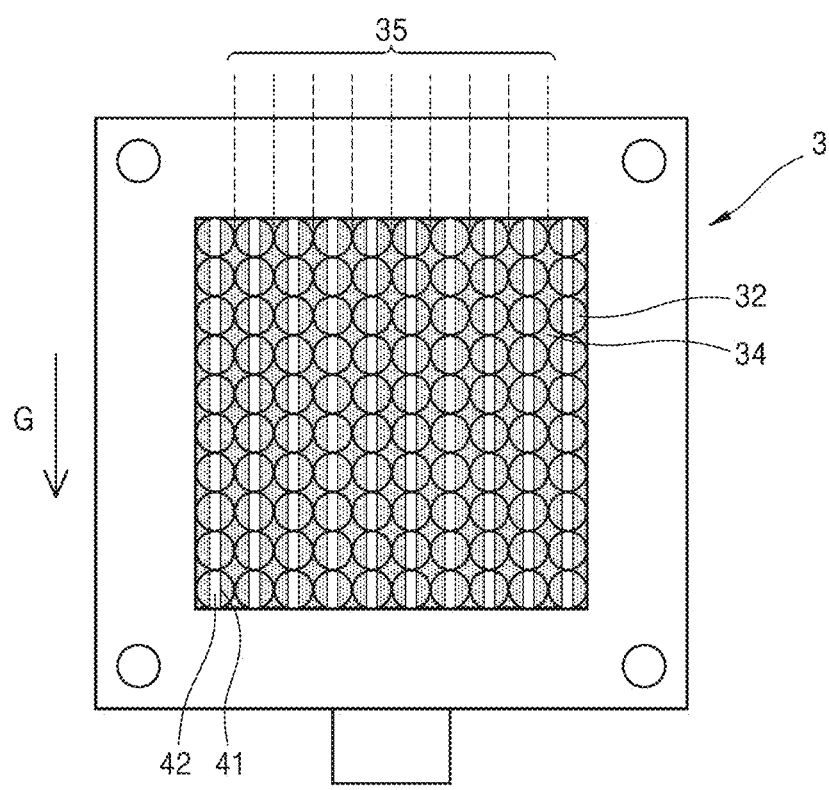
FIGS. 10 and 11 show examples of arrangement structures between a plurality of collision plates and exits of a plurality of micro-channels.
Figure 11:
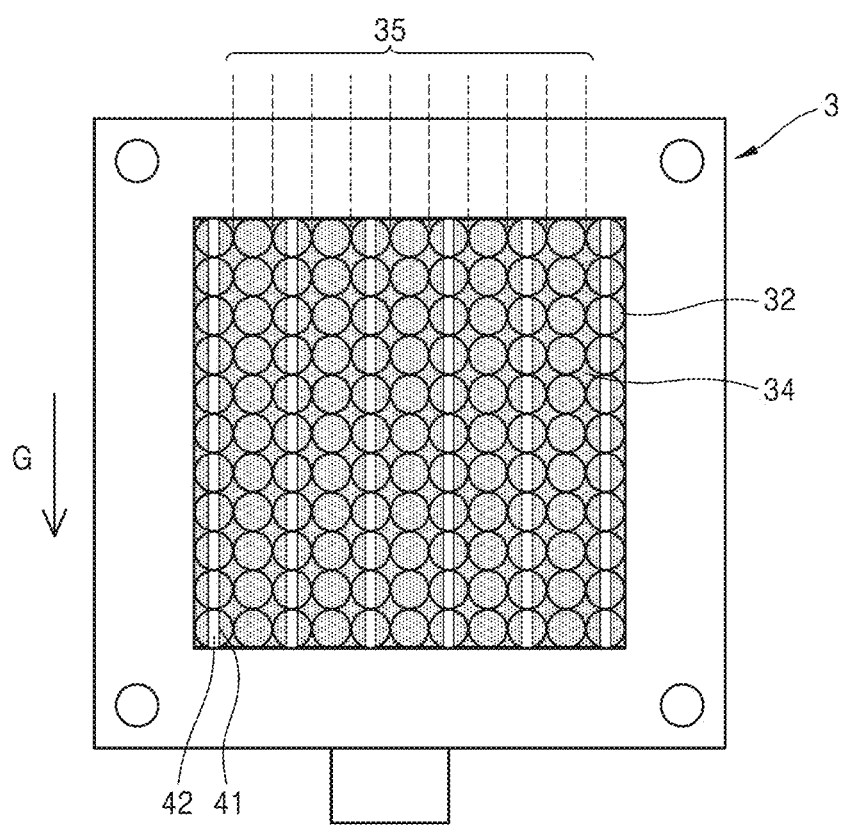

The plurality of collision plates 41 is arranged at the intervals 42. FIGS. 10 and 11 show examples of arrangement structures of the plurality of collision plates 41 and the exits 34 of the plurality of micro-channels 31. In FIGS. 10 and 11, only the downstream side (i.e., rear side) of the micro-channel forming unit 3 and the plurality of collision plates 41 are briefly illustrated.

Referring to FIGS. 10 and 11, the plurality of collision plates 41 may extend in a gravity direction G, and may be arranged at the intervals 42 in a direction orthogonal to the gravity direction G. The gas-liquid mixed fluid may be discharged through the intervals 42 between the plurality of collision plates 41 after colliding with the plurality of collision plates 41. Here, the gravity direction G is defined as a direction perpendicular to the flow direction F and corresponds to the direction of the gravity force when the particulate matter collecting apparatus is in use.

The plurality of collision plates 41 faces the exits 34 of the plurality of micro-channels 31. For example, the exits 34 of the plurality of micro-channels 31 may be regularly arranged in the gravity direction G and a direction orthogonal to the gravity direction G. In other words, the exits 34 of the plurality of the micro-channels 31 may include a plurality of exit columns 35 extended in the gravity direction G and arranged in a direction orthogonal to the gravity direction G. Each of the plurality of collision plates 41 may correspond to at least one of the exit columns 35. That is, each of the plurality of collision plates 41 may overlap at least one of the exit columns 35 in the flow direction F. For example, as shown in FIG. 10, each of the plurality of collision plates 41 may correspond to one of the exit columns 35. As shown in FIG. 11, each of the plurality of collision plates 41 may correspond to two of the exit columns 35, for another example. Of course, each of the plurality of collision plates 41 may correspond to two or more of the exit columns. The number of the plurality of collision plates 41 may be appropriately selected in consideration of a required air purification flow rate and air purification efficiency. The plurality of collision plates 41 is spaced apart from the micro-channel forming unit 3 in the flow direction F. The intervals between the plurality of collision plates 41 and the micro-channel forming unit 3 may be appropriately determined in consideration of the air purification efficiency.

The gas-liquid mixed fluid passing through the plurality of micro-channels 31 collides with the plurality of collision plates 41. The gas-liquid mixed fluid is accelerated while passing through the plurality of micro-channels 31 and collides with the plurality of collision plates 41, such that the droplets in the gas-liquid mixed fluid are scattered. Thus, the particulate matter contained in the gas-liquid mixed fluid may be additionally collected by the droplets. Both the droplets in which the particulate matter is collected and the droplets in which the particulate matter is not collected are attached to the plurality of collision plates 41. A liquid film is formed on surfaces of the plurality of collision plates 41 by the droplets. The particulate matter in the gas-liquid mixed fluid that is not collected by the droplets is in contact with the liquid film formed on the surfaces of the plurality of collision plates 41, and thus is collected by the liquid film. The liquid film flows downward along the surfaces of the plurality of collision plates 41 by gravity.

The impactor 4 may include a second water outlet 49-2 discharging water flowing down along the plurality of collision plates 41. The second water outlet 49-2 is formed to be opened downward under the hollow portion 49-1. The droplets flowing downward along the surfaces of the plurality of collision plates 41 are discharged through the second water outlet 49-2. The particulate matter collected by the droplets is discharged through the second water outlet 49-2 together with the droplets. Purified air passing through the impactor 4 is discharged through the exit 12 of the duct 1. The plurality of collision plates 41 may extend in the gravity direction G and may be arranged in a direction orthogonal to the gravity direction G, and thus, the droplets attached to the plurality of collision plates 41 may easily flow down toward the second water outlet 49-2 along the plurality of collision plates 41 by gravity. In addition, the possibility that the droplets flowing down along the plurality of collision plates 41 may be discharged to the exit 12 of duct 1, may be reduced.

As described above, the particulate matter in the gas-liquid mixed fluid may be primarily collected and filtered by the droplets by the micro-channel forming unit 3, and the particulate matter in the gas-liquid mixed fluid passing through the micro-channel forming unit 3 may be collected and filtered by the droplets in the impactor 4, and thus, the high air purification efficiency may be realized.

The pressure difference, that is, the pressure drop between upstream (i.e., front sides) and downstream (i.e., rear sides) sides of the micro-channel forming unit 3 and the impactor 4 may be controlled by controlling the porosity of the micro-channel forming unit 3, and thus, the pressure drop may be smaller than the pressure drop of a conventional filtering method. In addition, the probability of contact between the particulate matter and the droplets and the plurality of beads 32 may increase by the arrangement of the plurality of beads 32, and thus, the higher air purification efficiency than air purification efficiency of the conventional filtering method may be obtained. Also, the droplets collected with the particulate matter flow down from the surfaces of the plurality of beads 32 by gravity to be discharged through the first water outlet 39-2, and thus, the plurality of micro-channels 31 is not blocked even when used for a long time, unlike the conventional filtering method. Therefore, the burden of periodic maintenance or replacement of the micro-channel forming unit 3 may be reduced. The micro-channel forming unit 3 may not be required to be replaced depending on cases.

The gas-liquid mixed fluid is accelerated while passing through the plurality of micro-channels 31 and collides with the plurality of collision plates 41 such that the droplets in the gas-liquid mixed fluid are scattered. Thus, the particulate matter in the gas-liquid mixed fluid may be easily and additionally collected by the droplets. Therefore, the air purification efficiency may be further improved.

Referring to FIG. 1, the duct 1 may be provided with one or more water outlets 13 and 14. When the gas-liquid mixed fluid collides with an inner wall of the duct 1, a liquid film may be formed at the inner wall of the duct 1, and particulate matter may be collected by the liquid film. The liquid film flows down along the inner wall of the duct 1 in the gravity direction G, and is discharged outside the duct 1 through the water outlets 13 and 14. For example, the water outlet 13 may be arranged between the water sprayer 2 and the micro-channel forming unit 3. The water outlet 14 may be arranged at a downstream side (i.e., rear side) of the impactor 4. Water discharged through the water outlets 13 and 14 and the first and second water outlets 39-2 and 49-2 may be stored in a collection tank 8.

Figure 12:
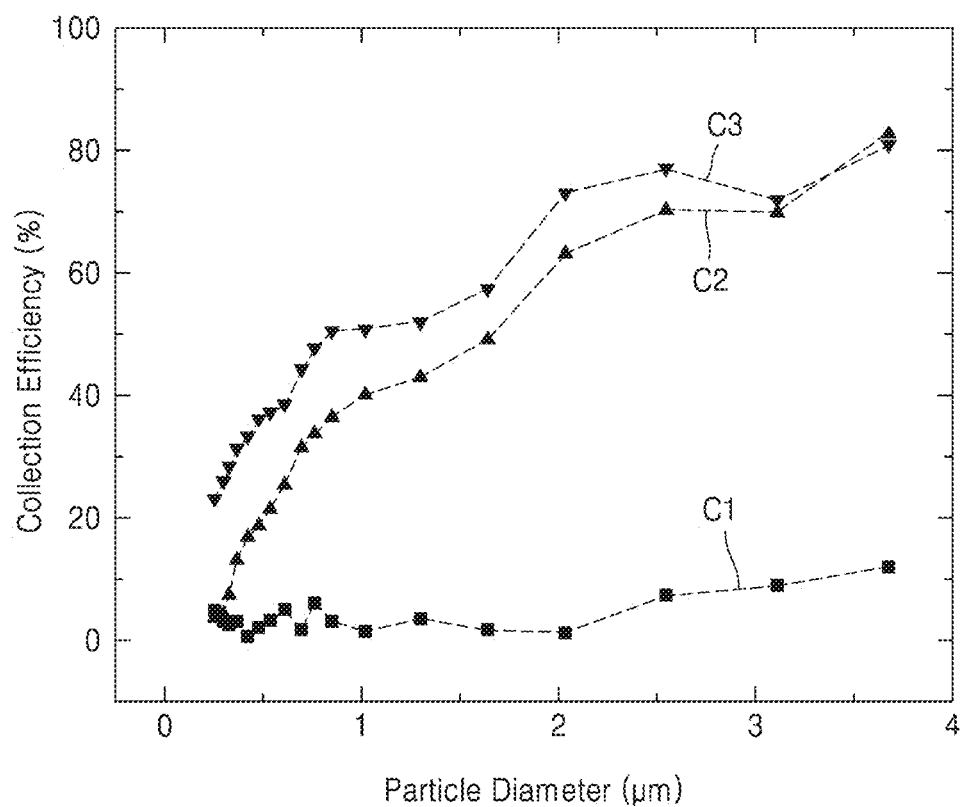
FIG. 12 is a graph showing a result of testing particulate matter collection efficiency.

FIG. 12 is a graph showing a result of testing the particulate matter collection efficiency (percentages: %) versus size of particle diameter (micrometers: μm) in accordance with examples and a comparative example. In FIG. 12, a curve C1 shows the particulate matter collection efficiency in case of arranging only the water sprayer 2, a curve C2 shows the particulate matter collection efficiency in case of arranging the water sprayer 2 and the micro-channel forming unit 3, and a curve C3 shows the particulate matter collection efficiency in case of arranging the water sprayer 2, the micro-channel forming unit 3, and the impactor 4.

Test conditions are as follows.

Bead: each of the glass beads with the diameter of 10 millimeters (mm)

Packing structure: a BCC structure, four layers, and 32% of the porosity

Air flow velocity: 2 meters per second (m/s)

Air flow rate: 1,200 liters per minute (L/min)

Water spray amount: 1.1 L/min, full cone nozzle

Particulate matter: NaCl

Intervals between the plurality of collision plates 41 and the micro-channel forming unit 3: 10 mm Referring to FIG. 12, as indicated by the curve C1, when only the water sprayer 2 is arranged, the particulate matter collection efficiency is 10% or less. As indicated by the curve C2, it may be understood that the particulate matter collection efficiency is greatly improved when the micro-channel forming unit 3 is arranged. In addition, as indicated by the curve C3, it may be understood that the particulate matter removal efficiency is additionally improved by almost 10% compared to the particulate matter removal efficiency of the curve C2 when the impactor 4 is added.

Although not shown in FIG. 12, it is confirmed that the particulate matter collection efficiency decreases as the distance between the micro-channel forming unit 3 and the plurality of collision plates 41 increases. The distance between the micro-channel forming unit 3 and the plurality of collision plates 41 may be appropriately determined in consideration of the desired air purification efficiency and air purification speed.

At least one of the micro-channel forming unit 3 and the impactor 4 may have a multi-stage structure. In other words, the micro-channel forming unit 3 may include the plurality of micro-channel forming units stacked in the flow direction F of the gas-liquid mixed fluid. At least one of the plurality of micro-channel forming units may have the diameters of the plurality of beads, different from the diameters of the plurality of beads of the remaining micro-channel forming units. One impactor 4 may be arranged at a downstream side (i.e., real side) of the plurality of micro-channel forming units. The impactor 4 may include the plurality of impactors arranged at the downstream side (i.e., real side) of each of the plurality of micro-channel forming units. At least one of the plurality of impactors may have the width of the plurality of collision plates, different from the width of the plurality of collision plates of the remaining impactors.

Figure 13:
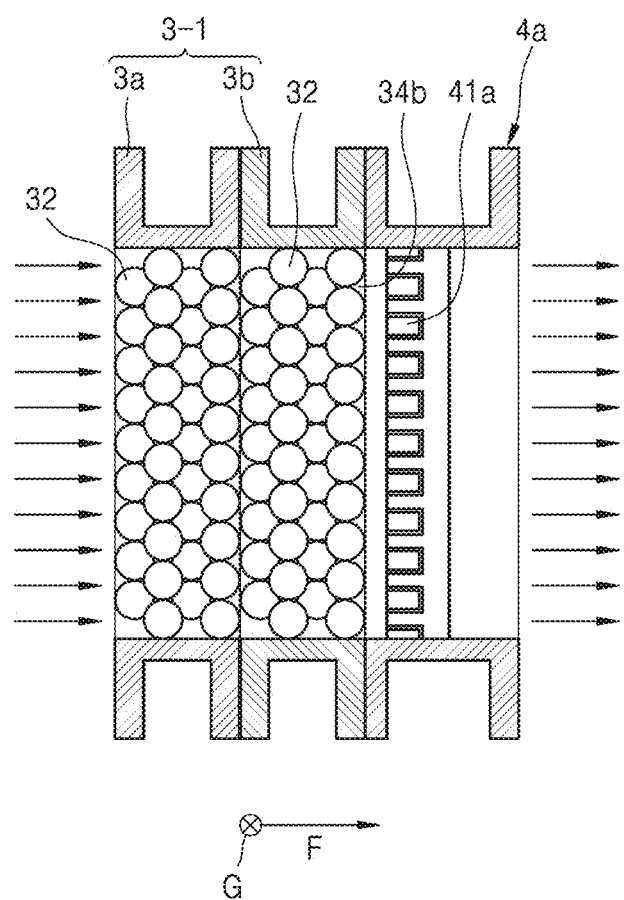
FIGS. 13 to 15 show embodiments of a micro-channel forming unit with a multi-stage structure.
Figure 14:
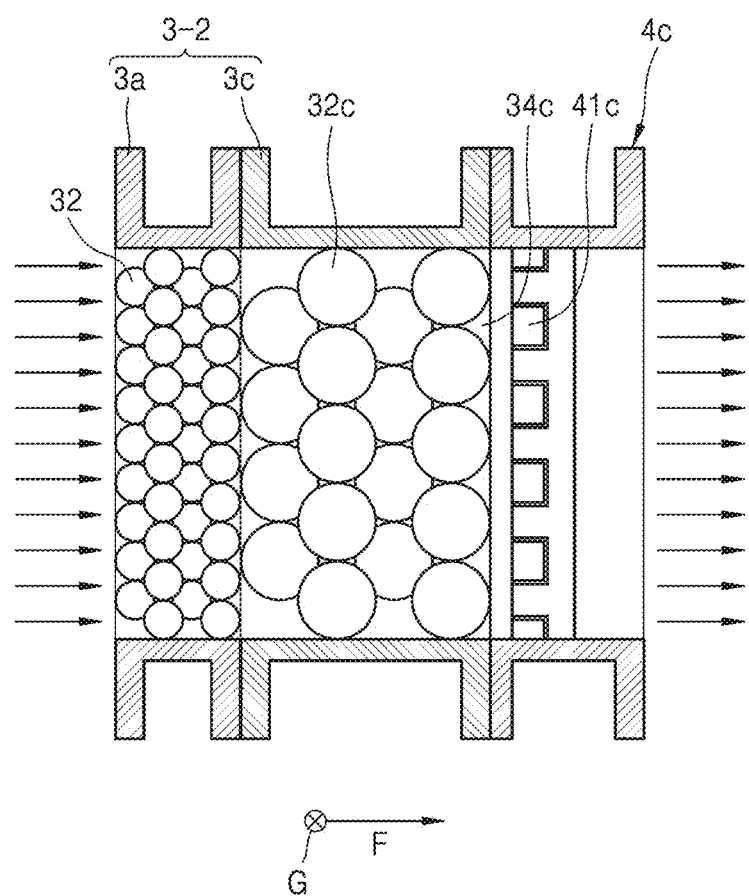
Figure 15:
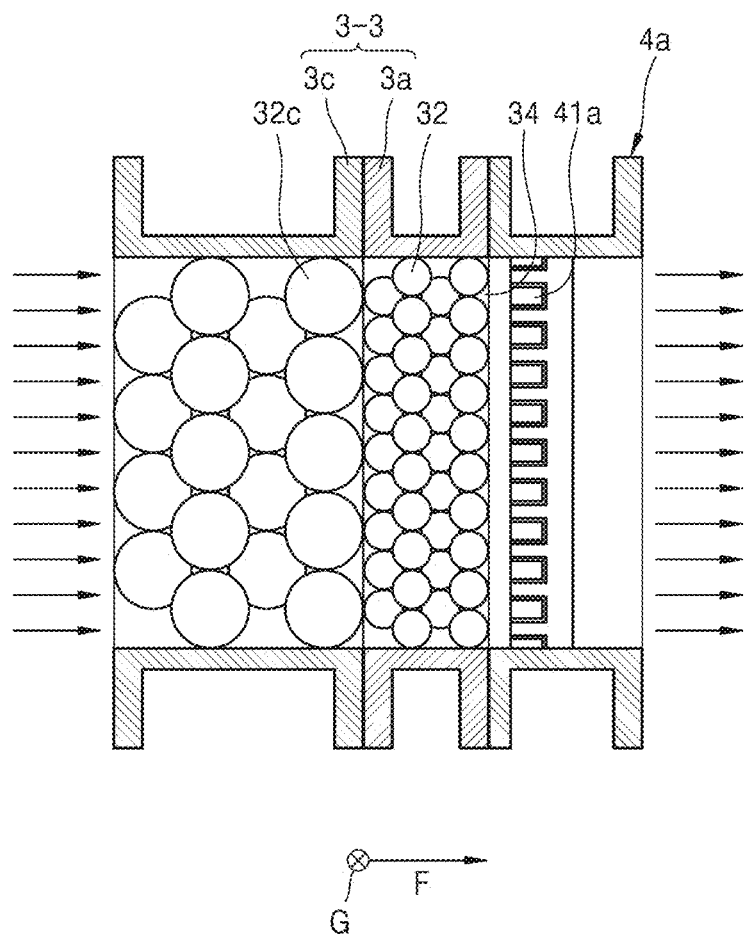

FIGS. 13 to 15 show embodiments of a micro-channel forming unit with a multi-stage structure. Referring to FIG. 13, a micro-channel forming unit 3-1 includes first and second micro-channel forming units 3a and 3b. The first and second micro-channel forming units 3a and 3b are the same as the micro-channel forming unit 3 described in FIGS. 2 to 4. The diameters of the plurality of beads 32 forming the first and second micro-channel forming units 3a and 3b are the same. A first impactor 4a is located at a downstream side (i.e., real side) of the second micro-channel forming unit 3b. The second micro-channel forming unit 3b is located at a downstream side (i.e., real side), among the first and second micro-channel forming units 3a and 3b. Collision plates 41a may face exits 34b of the second micro-channel forming unit 3b. A structure above is useful when a micro-channel forming unit having a large number of stacking layers of the plurality of beads 32 is required. For example, the plurality of beads 32 may not be easy to be stacked in eight layers in one micro-channel forming unit. In this case, the first and second micro-channel forming units 3a and 3b, which separately have a four-layered structure, respectively, may be arranged in the flow direction F of the gas-liquid mixed fluid, and thus, the micro-channel forming unit 3-1 with an eight-layered structure may be realized.

Referring to FIG. 14, a micro-channel forming unit 3-2 includes the first micro-channel forming unit 3a and a third micro-channel forming unit 3c, which are sequentially arranged in the flow direction F of the gas-liquid mixed fluid. The first and third micro-channel forming units 3a and 3c are the same as the micro-channel forming unit 3 described in FIGS. 2 to 4. However, the diameter of a bead 32c included in the third micro-channel forming unit 3c is larger than each of the diameters of the plurality of beads 32 included in the first micro-channel forming unit 3a. A third impactor 4c is located at a downstream side (i.e., real side) of the third micro-channel forming unit 3c located at a downstream side (i.e., real side) of the first micro-channel forming unit 3a. Collision plates 41c may face exits 34c of the third micro-channel forming unit 3c. The width of the collision plates 41c in a direction perpendicular to the flow direction F and the gravity direction G is larger than the width of the collision plates 41a.

Referring to FIG. 15, a micro-channel forming unit 3-3 includes the third and first micro-channel forming units 3c and 3a which are sequentially arranged in the flow direction F of the gas-liquid mixed fluid. The first impactor 4a is located at a downstream side (i.e., real side) of the first micro-channel forming unit 3a located at a downstream side (i.e., real side) of the third micro-channel forming unit 3c. The collision plates 41a may face the exits 34 of the first micro-channel forming unit 3a.

Structures shown in FIGS. 14 and 15 may be employed when the pressure drop in the flow direction of the gas-liquid mixed fluid may be required to be controlled.

Figure 16:
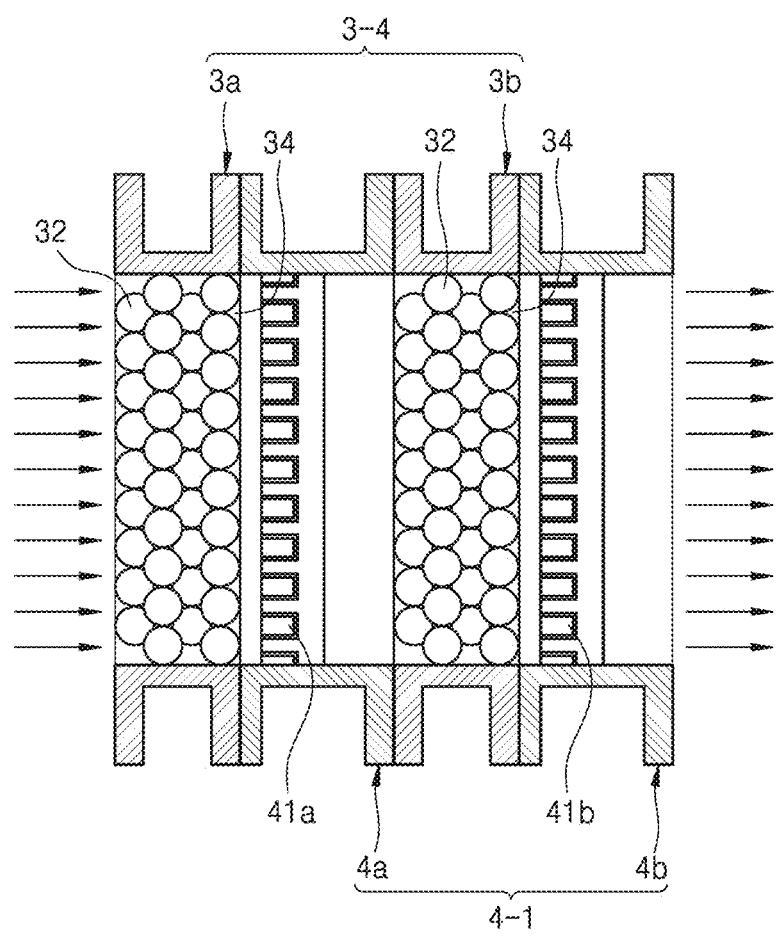
FIGS. 16 to 18 show embodiments of a micro-channel forming unit with a multi-stage structure and an impactor with a multi-stage structure.
Figure 17:
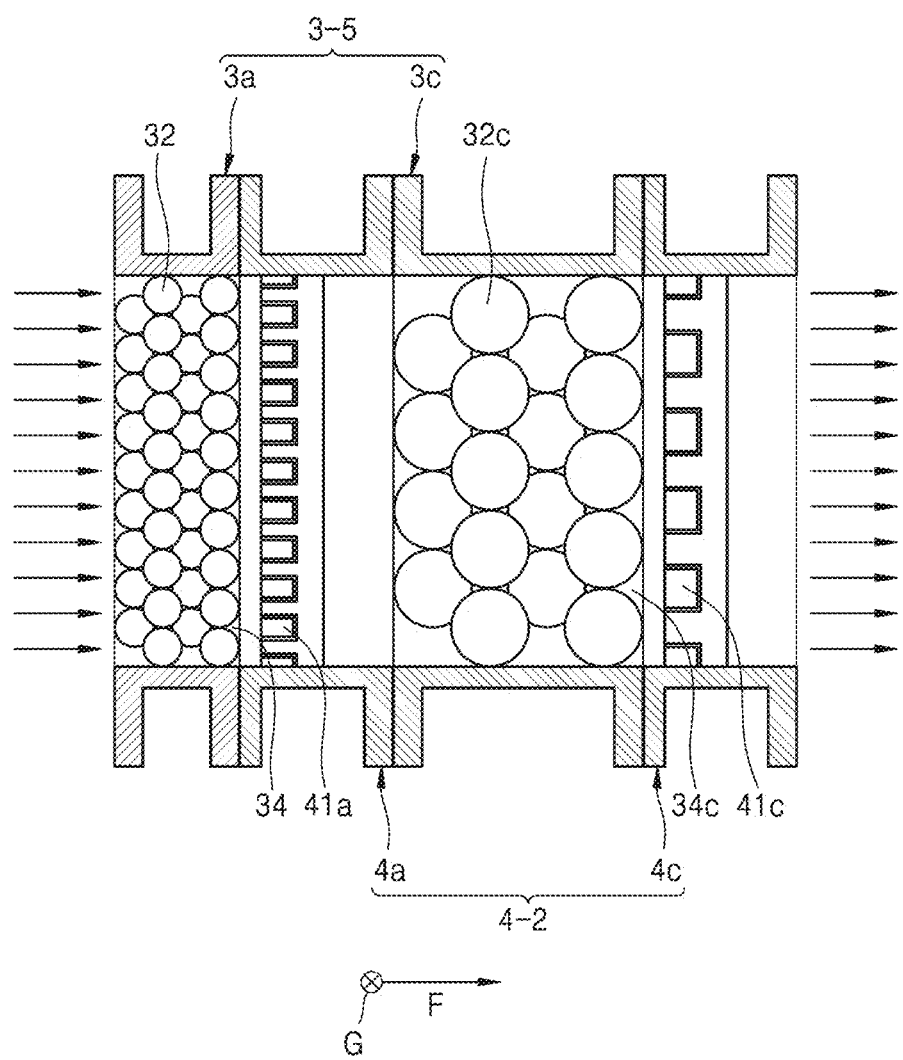
Figure 18:
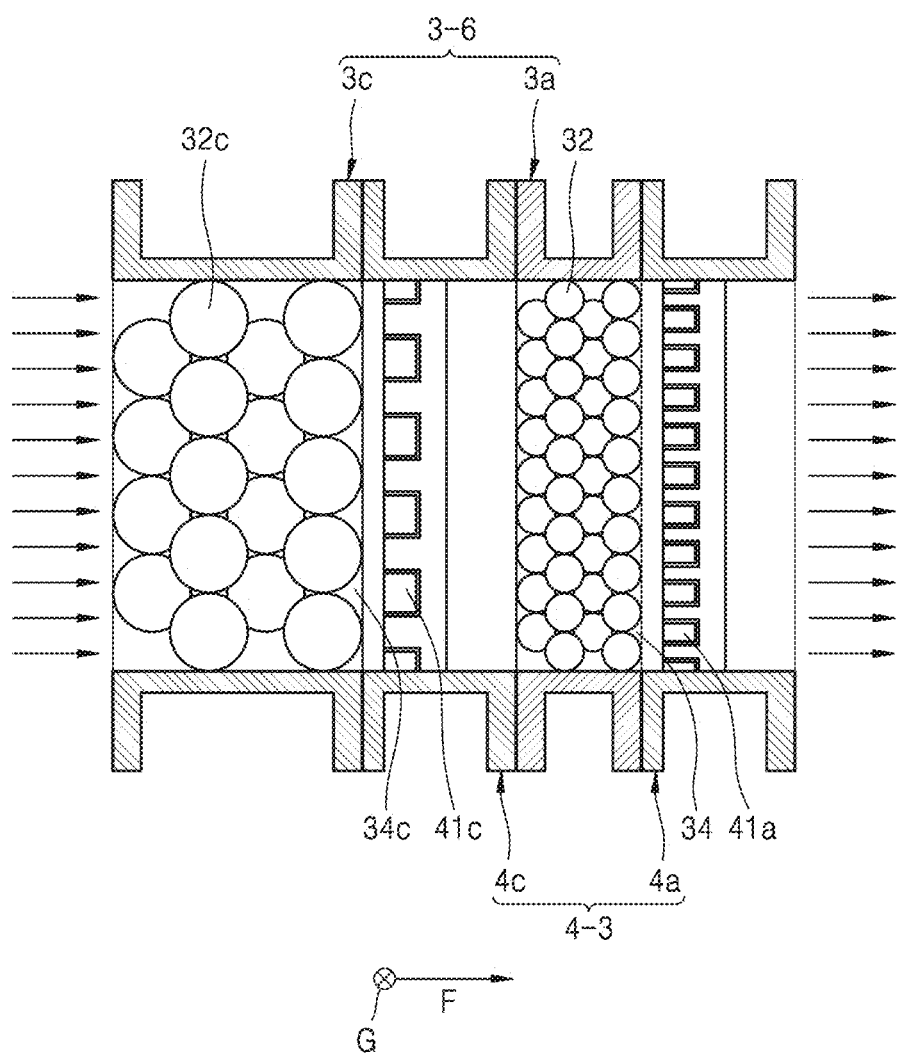

FIGS. 16 to 18 show embodiments of a micro-channel forming unit with a multi-stage structure and an impactor with a multi-stage structure. Referring to FIG. 16, a micro-channel forming unit 3-4 includes the first and second micro-channel forming units 3a and 3b. The first and second micro-channel forming units 3a and 3b are the same as the micro-channel forming unit 3 described in FIGS. 2 to 4. The diameters of the plurality of beads 32 included in the first and second micro-channel forming units 3a and 3b are the same. An impactor 4-1 includes the first impactor 4a and a second impactor 4b. The first and second impactors 4a and 4b are arranged at downstream sides (i.e., real side) of the first and second micro-channel forming units 3a and 3b, respectively. The collision plates 41a of the first impactor 4a face the exits 34 of the first micro-channel forming unit 3a. Collision plates 41b of the second impactor 4b face the exits 34 of the second micro-channel forming unit 3b.

Referring to FIG. 17, a micro-channel forming unit 3-5 includes the first and third micro-channel forming units 3a and 3c, which are sequentially arranged in the flow direction F of the gas-liquid mixed fluid. The diameter of the bead 32c included in the third micro-channel forming unit 3c is larger than each of the diameters of the plurality of beads 32 forming the first micro-channel forming unit 3a. An impactor 4-2 includes the first and third impactors 4a and 4c. The first and third impactors 4a and 4c are arranged at downstream sides (i.e., real side) of the first and third micro-channel forming units 3a and 3c, respectively. The collision plates 41a face the exits 34 of the first micro-channel forming unit 3a, and the collision plates 41c face the exits 34c of the third micro-channel forming unit 3c.

Referring to FIG. 18, a micro-channel forming unit 3-6 includes the third and first micro-channel forming units 3c and 3a which are sequentially arranged in the flow direction F of the gas-liquid mixed fluid. An impactor 4-3 includes the third and first impactors 4c and 4a. The third and first impactors 4c and 4a are arranged at downstream sides (i.e., real side) of the third and first micro-channel forming units 3c and 3a, respectively.

According to structures shown in FIGS. 16 to 18, particulate matter may be collected via two stages. In addition, structures shown in FIGS. 17 and 18 may be employed when the pressure drop in the flow direction F of the gas-liquid mixed fluid may be required to be controlled.

In the above-described embodiments, the micro-channel forming unit of two stages, or the micro-channel forming unit of two stages and the impactor of two stages may be employed, but the micro-channel forming unit of three stages or more, or the micro-channel forming units of three stages or more and the impactor of three stages or more may be employed in another embodiment.

Figure 19:
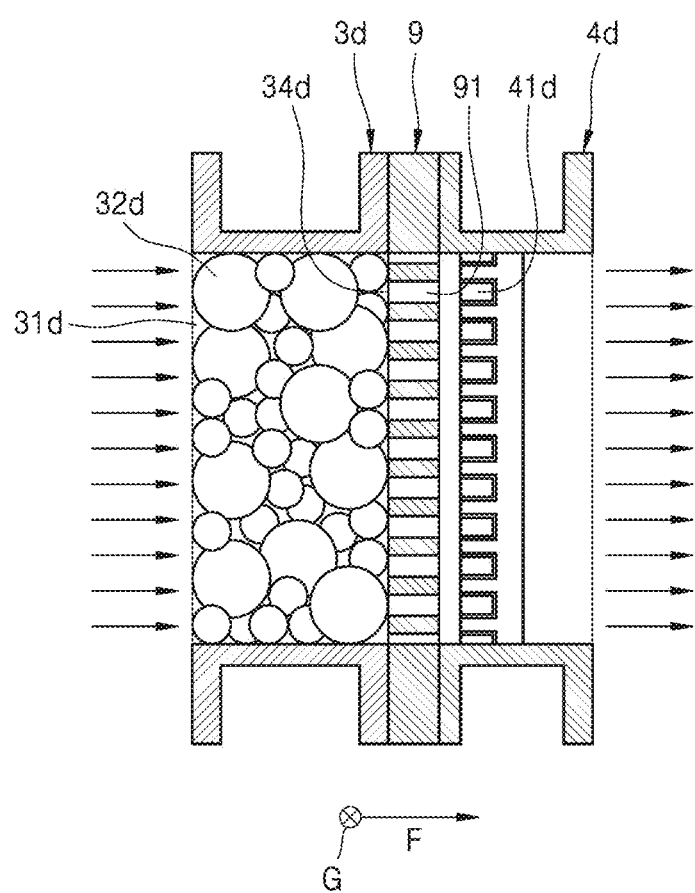
FIG. 19 is a schematic cross-sectional view of an embodiment of a particulate matter collecting apparatus.

FIG. 19 is a schematic cross-sectional view of an embodiment of the particulate matter collecting apparatus. Referring to FIG. 19, a micro-channel forming unit 3d and an impactor 4d are illustrated. The micro-channel forming unit 3d is the same as the micro-channel forming unit 3 illustrated in FIGS. 2 to 4 except for that the diameters of a plurality of beads 32d defining a plurality of micro-channels 31d are not the same. The plurality of beads 32d may not be a spherical body. The plurality of beads 32d may be any form as long as a pore may be defined when the plurality of beads 32*d* may be arranged regularly or irregularly. The plurality of beads 32*d* may not be uniform in the size, for example, the diameter. For example, the plurality of beads 32*d* may include various types of spherical beads with different diameters from each other. The plurality of beads 32*d* may include various types of beads with different shapes from each other. A plurality of collision plates 41*d* of the impactor 4*d* may be arranged at intervals to face exits 34*d* of a plurality of micro-channels 31*d*.

According to the configuration above, the arrangement of the exits 34*d* of the plurality of micro-channels 31*d* may be irregular. To allow the plurality of collision plates 41*d* of the impactor 4*d* to face the exits 34*d* of the plurality of micro-channels 31*d* at a high probability, an opening plate 9 defining regular openings 91 may be located between the micro-channel forming unit 3*d* and the impactor 4*d*. The openings 91 may be arranged in various forms as long as regularity is shown. For example, the openings 91 may be two-dimensionally arranged in a direction orthogonal to the flow direction F. The openings 91 of an embodiment may extend in the gravity direction G, and are arranged at intervals in a direction orthogonal thereto in another embodiment. The impactor 4*d* may face the openings 91, and may include the plurality of collision plates 41*d* extended in the gravity direction G and arranged in a direction orthogonal thereto. Each of the plurality of collision plates 41*d* may face two or more of the openings 91.

According to the configuration above, the probability of colliding the gas-liquid mixed fluid passing through the micro-channel forming unit 3*d* with the plurality of collision plates 41*d* may increase, and thus, the air purification performance may be improved.

Although not shown in the drawings, the opening plate 9 may be applied to an embodiment shown in FIGS. 2 to 18.

While embodiments of the particulate matter collecting apparatus have been described with reference to the figures to assist in understanding, these are to be regarded as merely exemplary, and it will be understood by those of ordinary skill in the art that various changes and other equivalent embodiments may be made within the spirit and scope of the present disclosure. Therefore, the scope of the present disclosure should be defined by the appended claims.

What is claimed is:

1. A particulate matter collecting apparatus, comprising:
a duct through which air flows;
a water sprayer which sprays water inside the duct to form a gas-liquid mixed fluid;
a micro-channel forming unit defining a plurality of micro-channels through which the gas-liquid mixed fluid passes and including a first water outlet which discharges water flowing down from the plurality of micro-channels; and
an impactor including a plurality of collision plates with which the gas-liquid mixed fluid passing through the plurality of micro-channels collides,
wherein the first water outlet is formed to be opened downward on a bottom of the micro-channel forming unit.

2. The particulate matter collecting apparatus of claim 1, wherein exits of the plurality of micro-channels are arranged regularly.

3. The particulate matter collecting apparatus of claim 2, wherein each of the plurality of collision plates faces at least one exit column of the plurality of micro-channels.

4. The particulate matter collecting apparatus of claim 3, wherein the plurality of collision plates extends in a gravity direction, and is arranged in a direction orthogonal to the gravity direction.

5. The particulate matter collecting apparatus of claim 1, wherein the micro-channel forming unit comprises a plurality of beads stacked in two or more layers in a flow direction of the gas-liquid mixed fluid, and the plurality of micro-channels is defined by pores between the plurality of beads.

6. The particulate matter collecting apparatus of claim 5, further comprising an opening plate located between the micro-channel forming unit and the impactor, and in which regular openings are defined.

7. The particulate matter collecting apparatus of claim 5, wherein the micro-channel forming unit is provided in plural, and the plurality of micro-channel forming units is stacked in the flow direction of the gas-liquid mixed fluid.

8. The particulate matter collecting apparatus of claim 7, wherein a diameter of the bead in at least one of the plurality of micro-channel forming units is different from diameters of the beads in remaining micro-channel forming units.

9. The particulate matter collecting apparatus of claim 7, wherein the impactor is provided in plural, and the plurality of impactors is arranged at downstream sides of the plurality of micro-channel forming units, respectively.

10. A particulate matter collecting apparatus comprising:
a duct through which air flows;
a water sprayer which sprays water inside the duct to form a gas-liquid mixed fluid;
a micro-channel forming unit including a channel forming frame and a plurality of beads stacked in two or more layers in a flow direction of the gas-liquid mixed fluid in the channel forming frame to define a plurality of micro-channels through which the gas-liquid mixed fluid passes; and
an impactor including a plurality of collision plates which are arranged at intervals and with which the gas-liquid mixed fluid passing through the plurality of micro-channels collides,
wherein a liquid film formed by the water is formed on surfaces of the plurality of micro-channels, and
the channel forming frame is provided with a first water outlet which discharges water flowing down along the surfaces of the plurality of micro-channels.

11. The particulate matter collecting apparatus of claim 10, wherein the plurality of collision plates extends in a gravity direction, and is arranged in a direction orthogonal to the gravity direction.

12. The particulate matter collecting apparatus of claim 10, wherein the diameters of the plurality of beads are not uniform.

13. The particulate matter collecting apparatus of claim 12, further comprising an opening plate located between the micro-channel forming unit and the impactor, and in which regular openings are defined.

14. The particulate matter collecting apparatus of claim 10, wherein the diameters of the plurality of beads are the same.

15. The particulate matter collecting apparatus of claim 10, wherein the micro-channel forming unit is provided in plural, and the plurality of micro-channel forming units is stacked in the flow direction of the gas-liquid mixed fluid.

16. The particulate matter collecting apparatus of claim 15, wherein a diameter of the bead in at least one of the plurality of micro-channel forming units is different from diameters of the beads in remaining micro-channel forming units.

17. The particulate matter collecting apparatus of claim 15, wherein the impactor is provided in plural, and the plurality of impactors is arranged at downstream sides of the plurality of micro-channel forming units, respectively.

18. The particulate matter collecting apparatus of claim 10, wherein a liquid film formed by the water is formed on surfaces of the plurality of collision plates, and the impactor comprises a second water outlet which discharges water flowing down along the plurality of collision plates.

19. The particulate matter collecting apparatus of claim 10, wherein the duct is provided with at least one water outlet.

20. A particulate matter collecting apparatus comprising:
a duct through which air flows;
a water sprayer which sprays water inside the duct to form a gas-liquid mixed fluid;
a micro-channel forming unit including a channel forming frame and a plurality of beads stacked in two or more layers in a flow direction of the gas-liquid mixed fluid in the channel forming frame to define a plurality of micro-channels through which the gas-liquid mixed fluid passes; and
an impactor including a plurality of collision plates which are arranged at intervals and with which the gas-liquid mixed fluid passing through the plurality of micro-channels collides,
wherein diameters of the plurality of beads are not uniform.

* * * * *